(12) United States Patent
Carlsson

(10) Patent No.: US 7,722,132 B2
(45) Date of Patent: May 25, 2010

(54) SERVO-BRAKE SYSTEM IN AN OTTO CYCLE ENGINE

(75) Inventor: Mats Carlsson, Vänersborg (SE)

(73) Assignees: GM Global Technology Operations, IncMI (US); Fiat Auto S.p.A. (IT)

( * ) Notice: Subject to any disclaimer, the term of this patent is extended or adjusted under 35 U.S.C. 154(b) by 1035 days.

(21) Appl. No.: 11/440,523

(22) Filed: May 25, 2006

(65) Prior Publication Data

US 2007/0063579 A1 Mar. 22, 2007

(30) Foreign Application Priority Data

May 25, 2005 (SE) .................................... 0501178

(51) Int. Cl.
 *B60T 8/44* (2006.01)
(52) U.S. Cl. ...................... 303/114.3; 303/12; 60/397
(58) Field of Classification Search .................. 303/12, 303/115.3, 114.3
 See application file for complete search history.

(56) References Cited

U.S. PATENT DOCUMENTS 4,211,200 A 7/1980 Rocchio et al. ............. 123/445
4,554,786 A 11/1985 Takeuchi et al. ............. 60/397

FOREIGN PATENT DOCUMENTS

DE 198 42 751 A1 3/2000
JP 2004243837 A * 9/2004

OTHER PUBLICATIONS

Machine translation of the description of DE 198 42 751.*

* cited by examiner

*Primary Examiner*—Bradley T King
(74) *Attorney, Agent, or Firm*—Ostrolenk Faber LLP

(57) ABSTRACT

The present invention relates to an internal combustion engine (1) of the Otto type, comprising an induction pipe (3) in conjunction with the engine's (1) cylinders, a brake servo unit (15), a flow connection (29) for evacuating air from the brake servo unit (15) to the induction pipe (3) for the purpose of building up a vacuum inside the brake servo unit (15), in conjunction with which a Venturi unit (25) is arranged in the flow connection (17, 19) to assist with the building up of the aforementioned vacuum. The internal combustion engine is characterized in that the flow connection (17, 19) comprises a bypass line (29) having a lower flow resistance than the Venturi unit (25), the bypass line (29) being intended to connect the evacuated air past the Venturi unit (25) in the event of a transient vacuum in the induction pipe (3).

9 Claims, 5 Drawing Sheets

SERVO-BRAKE SYSTEM IN AN OTTO CYCLE ENGINE

TECHNICAL FIELD

The present invention relates to an internal combustion engine.

The invention also relates to an apparatus for building up a brake vacuum.

BACKGROUND ART

The purpose of a brake servo unit in a motor vehicle is to amplify the force from a driver's foot when the driver presses the brake pedal. For this purpose, a vacuum is generated inside the brake servo unit when the difference between the atmospheric pressure and the vacuum inside the brake servo unit assists the driver in his task of actuating the brake pedal.

DISCLOSURE OF INVENTION

A previously disclosed method of generating this vacuum is to use a vacuum pump operated, for example, by the camshaft of the vehicle. FIG. 1 depicts this type of solution in the form of a 4-cylinder internal combustion engine 2 of the Otto type arranged in a vehicle that is not shown here. The engine comprises an induction pipe 4, a throttle housing 6 with a throttle 8, a compressor 10, a mass air flow sensor 12 and an air filter 14. When the engine is running, air is sucked in via the air filter, passes through the mass air flow sensor and the compressor and is then supplied to the cylinders of the engine where it participates in the combustion process.

The internal combustion engine additionally comprises a brake servo unit 16, which is in flow connection with the induction pipe 4 via various lines 18, 20. In addition, a vacuum pump 22 is also in flow connection with the brake servo unit. When a vacuum is present in the induction pipe, air present inside the brake servo unit 16 (which enters the latter in conjunction with braking of the vehicle with the help of the brake pedal 24) is sucked into the induction pipe 4 and into the vacuum pump 22 so that a vacuum can be maintained inside the brake servo unit. In situations in which atmospheric pressure or a pressure above atmospheric pressure is present in the induction pipe, various check valves 26, 28 in the lines prevent the equalization of the pressure between the induction pipe and the brake servo unit. In these situations, only the vacuum pump sucks air from the brake servo unit. An acceptable braking performance is certainly assured with this type of system regardless of the driving mode. The vacuum pump 22 involves an expensive installation, on the other hand, which also has a negative effect on fuel consumption. A vacuum pump operated by the camshaft also has a relatively modest suction capacity, as a consequence of which the charging performance of the system is slow.

This system, although it lacks a vacuum pump, would instead involve large quantities of air flowing uncontrolled into the induction pipe, which would result in unstable combustion with strong variations in the speed of rotation of the engine as a consequence, in particular in conjunction with active braking at low engine loads and speeds.

Another way of making a brake servo system available without resorting to an expensive vacuum pump is depicted in FIG. 2. According to this system, the brake servo unit 16 is in flow connection with the induction pipe 4 with the help of various lines 18, 20 via a Venturi tube 34. The Venturi tube is also in flow connection with the throttle housing 6 immediately upstream of the throttle via a line 36. The air which penetrates into the brake servo unit from the surroundings in conjunction with braking is evacuated into the induction pipe via the lines 18, 20 and the Venturi tube 34 and then participates in the combustion process in the customary manner. The Venturi tube 34 represents a flow resistance to this air flow, for which reason the quantity of air that can be evacuated from the brake servo unit 16 in a given unit of time is limited. On the other hand, the Venturi tube causes a drop in pressure for the air flow, which is further amplified when a flow of air arrives at the Venturi tube via the line 36. This takes place in accordance with the Venturi principle, that is to say the static pressure in the narrowest part of the Venturi tube falls in favour of an increase in the dynamic pressure. The extra air flow from the throttle housing 6 is permitted when a drop in pressure is present over the throttle 8. It is thus possible to create a vacuum inside the brake servo unit that is lower than in the induction pipe 4, which of course improves the performance of the braking system. However, the flow resistance represented by the Venturi tube means that the charging performance of the system is slow.

OBJECTS OF THE INVENTION

One object of the present invention is thus to ensure a good charging performance for the system.

Another object of the invention is to achieve a good stability for the speed of rotation during idling and low-load conditions.

A further object of the invention is to ensure a good braking performance and pedal feel, regardless of the driving mode, and without the need to use a vacuum pump.

SUMMARY OF THE INVENTION

These objects are achieved with an internal combustion engine and an apparatus.

The vacuum that arises in the induction pipe in the event of transient load alternations, for example in conjunction with alternations during acceleration of the motor vehicle, can be better utilized with a Venturi unit that is capable of being bypassed. The reason is that the air evacuated from the brake servo unit, because of the lower flow resistance in the bypass line, is led through the bypass line instead of through the Venturi unit. In this way, it is possible for the evacuation of the air to take place more rapidly than if the evacuation of the air were to be effected via the Venturi unit. This being the case, the occasional reduction in pressure produced by this type of load alternation can be utilized more effectively, and a more rapid build-up of the brake vacuum can take place.

The bypass line is appropriately arranged parallel over the Venturi unit. A simple and effective way of bypassing the Venturi unit is achieved by this means.

The flow connection preferably comprises a first line, which connects a flow from the Venturi unit to the induction pipe, and a second line, which connects a flow from the Venturi unit to the brake servo unit. In this way, the Venturi unit can be arranged in an appropriate manner in the flow connection.

The flow connection preferably also comprises a third line, which connects a flow from the Venturi unit to the induction pipe upstream of the engine throttle, the third line being intended to conduct working air to the Venturi unit when a drop in pressure is present over the throttle. It is possible in this way for a larger vacuum to be achieved through the Venturi effect than that which is present in the induction pipe, that is to say the flow of working air contributes to an increase in the dynamic pressure and thus to a static reduction in the pressure in the narrowest part of the Venturi unit.

The first line, the second line and the bypass line preferably have an internal diameter that is ≧9 mm. Achieved in this way is a line dimension which permits the rapid evacuation of air from the brake servo unit to the induction pipe.

The bypass line appropriately has a first end connected to the first line and a second end connected to the second line. It is possible in this way for the bypass line to be connected to the flow connection in an appropriate manner. The bypass line preferably comprises a valve arrangement that is intended to be closed for the purpose of conducting air through the Venturi unit, and to be open for the purpose of conducting air through the bypass line. The control of the air through the flow connection can be managed easily in this way.

The valve arrangement is appropriately intended to open in conjunction with load alternations from vacuum to positive pressure in the induction pipe, and the valve arrangement preferably has an opening characteristic from the closed to the open position in the order of <0.5 second. In this way, the bypass line is brought rapidly into a state of readiness for air evacuation in the event of any transient vacuum in the induction pipe.

The valve arrangement is appropriately intended to close in conjunction with load alternations from positive pressure to vacuum in the induction pipe, in conjunction with which closing of the valve arrangement is intended to take place at a speed such that pressure equalization, between the induction pipe and the brake servo unit in the event of a transient vacuum in the induction pipe, has sufficient time to take place before the valve arrangement has closed, and the valve arrangement preferably has a closing characteristic from the open to the closed position in the order of 2-10 seconds. Given that the valve arrangement is closed when a vacuum is present inside the induction pipe, no air evacuation from the brake servo unit takes place through the bypass line, but rather through the Venturi unit. As a result, there are no strong variations in the speed of rotation of the engine in conjunction with frequent braking at low engine loads and speeds, as all the air is forced to pass through the Venturi unit. Because closing of the valve arrangement still occurs sufficiently slowly for pressure equalization between the induction pipe and the brake servo unit to have sufficient time to take place before the valve arrangement has closed, there is sufficient time for a vacuum to build up in the brake servo unit in the event of a transient vacuum in the induction pipe. A good braking performance can thus be assured in this way, including in the case of spirited driving.

BRIEF DESCRIPTION OF DRAWINGS

The invention is now described with reference to the accompanying drawings, in which.

MODE(S) FOR CARRYING OUT THE INVENTION

Figure 1:
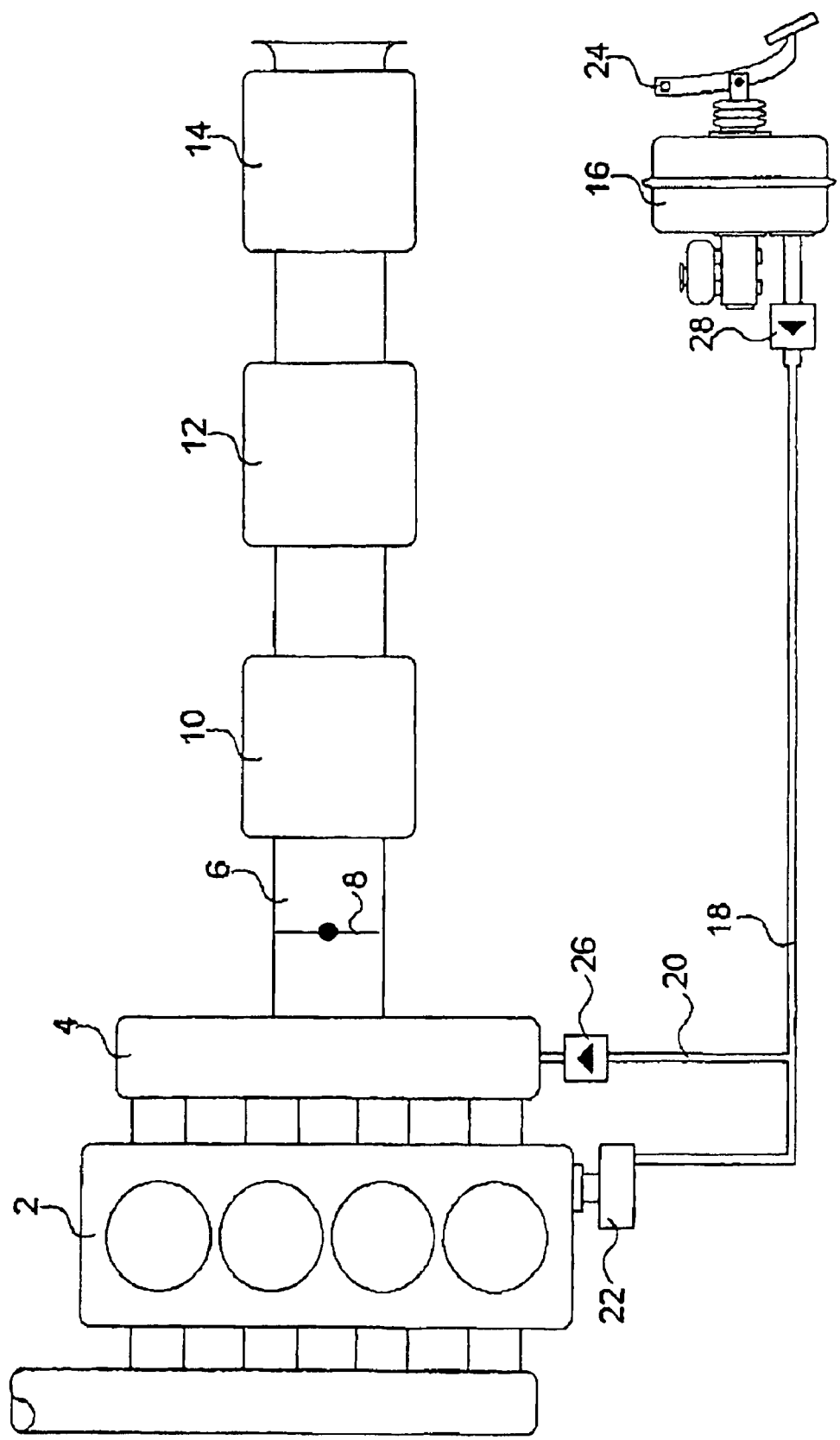
FIG. 1 depicts a first variant of a brake servo system according to the state of the art.
Figure 2:
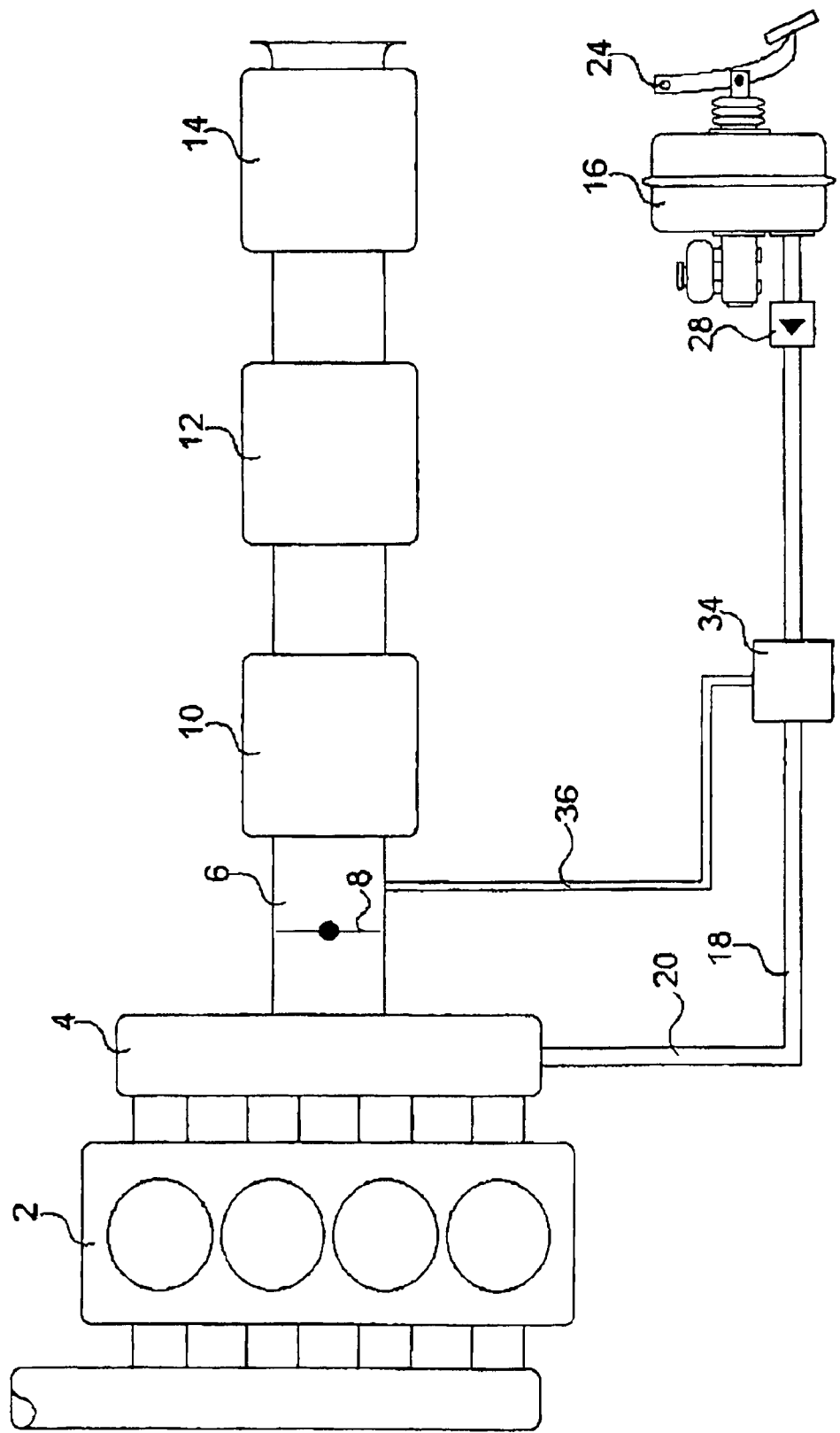
FIG. 2 depicts a second variant of a brake servo system according to the state of the art.
Figure 3:
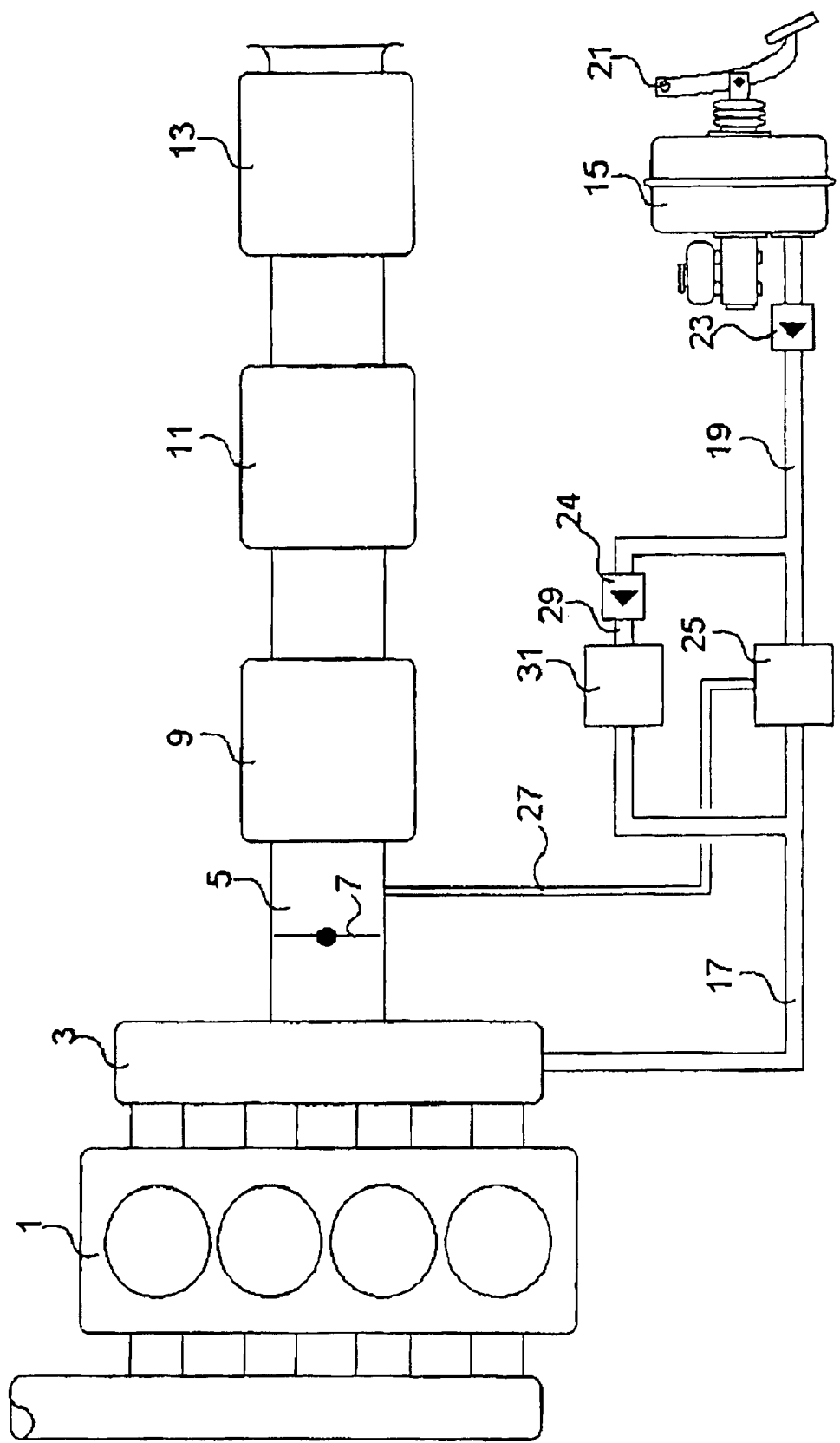
FIG. 3 depicts schematically a preferred embodiment of a brake servo system according to the invention.

FIG. 3 depicts a preferred embodiment of a brake servo system according to the invention. A 4-cylinder internal combustion engine 1 of the Otto type comprises an induction pipe 3, a throttle housing 5 with a throttle 7, a compressor 9, a mass air flow sensor 11 and an air filter 13. When the engine 1 is running, air is sucked in via the air filter 13 in the conventional manner, passes through the mass air flow sensor 11, if necessary is charged into the compressor 9, and is then supplied to the cylinders of the engine where it participates in the combustion process.

A brake servo unit 15 is in flow connection with the induction pipe 3 via a first line 17 and a second 19 line. A brake pedal 21 is connected to the brake servo unit 15, and when a driver applies this in conjunction with braking, the brake servo unit 15 amplifies the force from the driver's foot. This is possible when a vacuum is present inside the brake servo unit. Arranged in the second line 19 is a check valve 23 for the purpose of preventing equalization of the pressure between the induction pipe 3 and the brake servo unit 15 in situations in which the pressure present in the induction pipe is higher than in the brake servo unit. A Venturi unit in the form of a Venturi tube 25 is arranged in the flow connection between the brake servo unit and the induction pipe, between the first line 17 and the second 19 line. The Venturi tube 25 involves a constriction of the flow connection 17, 19 and as such constitutes a local flow resistance therein. A third line 27 extends to the Venturi tube 25 from the throttle housing 5, immediately upstream of the throttle 7. This line 27 is intended to supply working air to the Venturi tube 25, as explained in greater detail below.

Arranged parallel over the Venturi tube 25 is a bypass line 29, which connects a flow between the first line 17 and the second line 19 respectively, and in so doing short-circuits the Venturi tube 25. Arranged in the bypass line 29 is a valve arrangement 31, the function of which is described in more detail below. The flow resistance through the valve arrangement 31 is significantly lower than the flow resistance through the Venturi tube 25. Also arranged in the bypass line 29 is a check valve 24 for the purpose of preventing equalization of the pressure between the induction pipe 3 and the brake servo unit 15 in situations in which the pressure present in the induction pipe is higher than in the brake servo unit.

Figure 4:
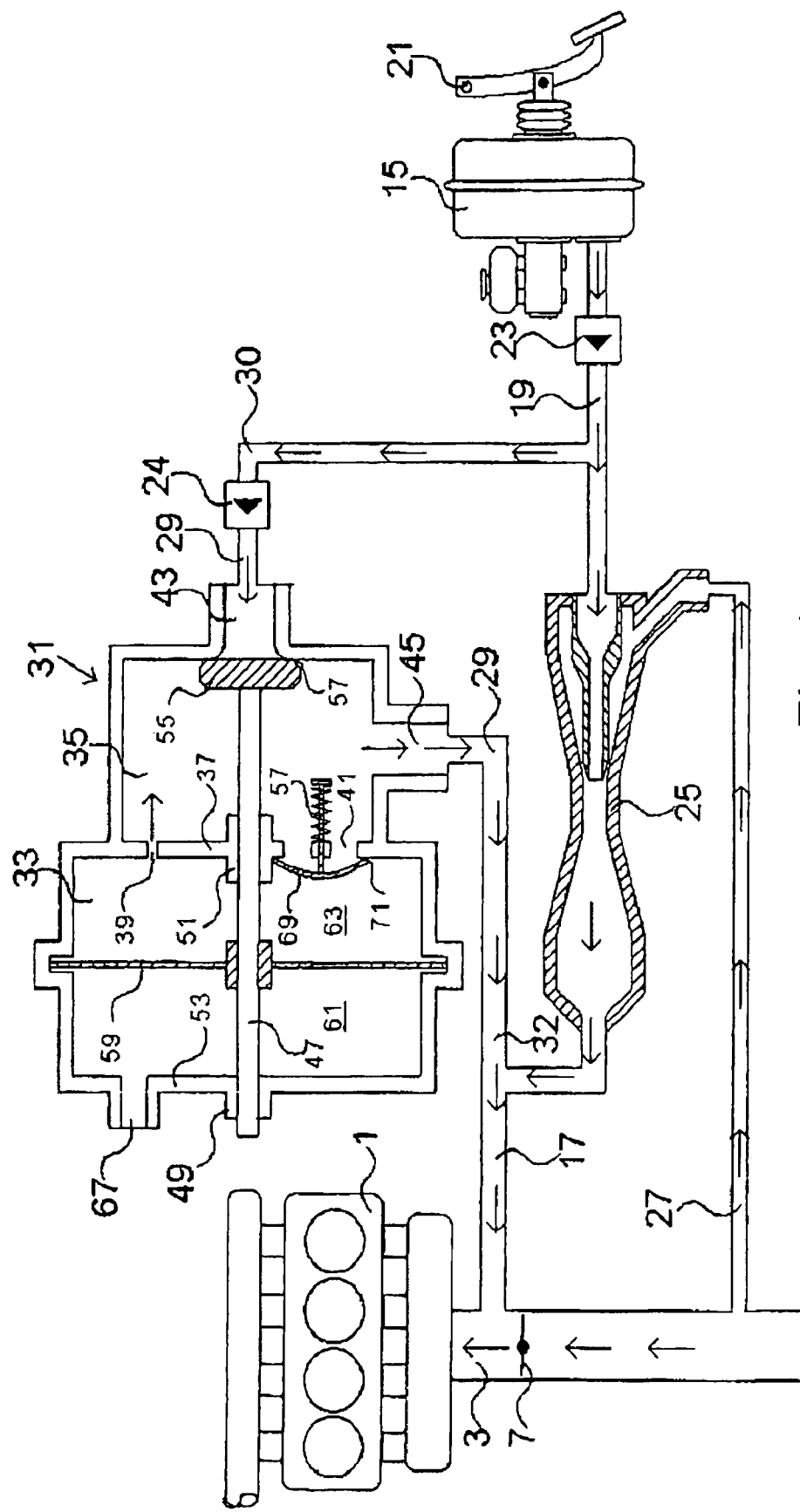
FIG. 4 depicts a more detailed representation of the brake servo system according to the invention.

FIG. 4 shows the brake servo system in more detail. The valve arrangement 31, which is arranged in the bypass line 29, comprises a first chamber 33 and a second chamber 35, which are separated by a partition wall 37. The partition wall comprises a first passage 39 and a second 41 passage, in conjunction with which the first chamber 33 and the second 35 chamber can be in connection with one another to provide a flow via the first passage 39 and/or the second 41 passage. The second chamber 35 in turn contains a third passage 43, which is connected to the second line 19, via a first end 30 of the bypass line 29, and which leads to the brake servo unit 15, together with a fourth passage 45, which is connected to the first line 17, via a second end 32 of the bypass line 29, and which leads to the induction pipe 3.

An elongated valve rod 47 is supported in first 49 and second 51 bearing devices. The first bearing device 49 is situated in a wall segment 53 of the first chamber 33, while the second bearing device 51 is situated in the partition wall 37 between the first chamber 33 and the second chamber 35. The valve rod 47 extends from the first chamber 33, through the second bearing device 51 in the partition wall, and into the second chamber 35. Thanks to this arrangement, the valve rod is able to move back and forth in its axial direction.

A valve body 55 is arranged at the end of the valve rod 47 that is present in the second chamber 35. The valve rod is capable of being displaced between a first and a second end position. The first end position corresponds to the situation in which the valve body 55 is in contact with a valve seat 57 around the third passage 43. In this position, the valve body 55 seals against the valve seat 57 and in so doing closes the third passage 43 and thus keeps the second chamber closed in relation to the second line 19. The second end position corresponds to the situation in which the valve body 55 is in contact with the second bearing device 51, with the result that the second chamber 35 is completely open in relation to the second line 19, via the third passage 43. In actual fact, the third passage 43 opens long before the valve body 55 has reached the second end position.

Arranged around the valve rod in the first chamber is a flexible membrane 59. The membrane 59 divides up the first chamber 33 into a first section 61 and a second section 63 and provides a seal between these in such a way that no flow connection exists between the first section 61 and the second 63 section. The first section contains a fifth passage 67, which is open to the surroundings, in which case atmospheric pressure is always present in the first section 61.

The second passage 41 in the partition wall 37 is provided with a valve element 69 respectively for opening and closing the second passage 41. A second valve seat 71 is arranged on the side of the partition wall 37 that faces in towards the second section 63. A pretensioned tension spring 73 is connected to the valve element 69 and is pretensioned in such a way that the valve element is able to move in the axial direction of the tension spring 73 and normally makes contact with the valve seat 71 and, in so doing, seals around the second passage 41 so that no air flow is permitted through the second passage. Only when the pressure has become sufficiently greater in the second chamber 35 than in the second section 63, so that this difference in pressure results in a force acting on the valve element that is greater than the spring force of the tension spring, will the spring element 69 move to the left (viewed in FIG. 4). The second passage 41 is then opened and permits an air flow through the second passage 41. The size of the second passage 41 in relation to the volume of the second section 63 is selected so that, once the valve element 69 has actually opened, pressure equalization of the two spaces 35, 63 takes place essentially instantaneously, unlike the size of the first passage 39, which is selected so that the pressure equalization of the two spaces is considerably more damped.

When the engine is running, in situations in which a vacuum is present inside the induction pipe 3, that is to say at low engine loads and speeds, which corresponds to a partially open throttle 7, a vacuum is also formed in the second chamber 35 of the valve arrangement, because this is directly in connection with the vacuum in the induction pipe 3 via the bypass line 29 and the first line 17. For this reason, the valve element 69 holds the second passage 41 closed when the vacuum in the second chamber assists the work of the tension spring 73 by holding the valve element 69 closed, at the same time as a slow pressure equalization takes place between the second section 63 and the second chamber 35 due to a certain air flow via the first passage 39. As the pressure in the second section 63 is gradually adapted to the pressure in the second chamber 35, the atmospheric pressure in the first section 61 acts more strongly on the membrane 59 and, in so doing, forces the valve rod 47 to the right, in conjunction with which the valve body 55 seals even more strongly against the valve seat 57 around the third passage 43. The bypass line 29 between the induction pipe 3 and the brake servo unit 15 is thus completely closed.

During these engine operation situations, the brake servo unit 15 is in flow connection with the induction pipe 3 only via the second line 19, the Venturi tube 25 and the first line 17. The prevailing vacuum in the induction pipe 3 thus seeks to evacuate air from the brake servo unit 15 via the Venturi tube 25 and, in so doing, to build up a vacuum therein. As the air passes through the narrowest part of the Venturi tube, the air experiences a dynamic increase in pressure, which in turn leads to a lowering of the static pressure of the air. Because the throttle 7 is partially open, a pressure drop is present over it, which results in a working flow of air flowing through the third line 27 in the direction of the Venturi tube 25 and being connected to the air flow from the brake servo unit 15. The working flow contributes even further to the increase in the dynamic pressure, as a consequence of which the static pressure is able to fall even more. For this reason (that is to say the Venturi effect), when a vacuum of −50 kPa, for example, is present inside the induction pipe 3, the Venturi tube 25 is able to reduce the pressure inside the brake servo unit 15 to −70 kPa. This permits a greater accumulation of a vacuum inside the brake servo unit.

If the driver in this situation, with a fully developed vacuum in the brake servo unit 15, performs a braking manoeuvre of the vehicle, air at atmospheric pressure exits from the brake servo unit 15 and is sucked through the second line 19 and the first 17 line via the Venturi tube 25 and into the induction pipe 3 at the precise moment when the driver releases the brake pedal 21. This continues until the vacuum inside the brake servo unit 15 reaches its maximum value, and on condition that a vacuum continues to prevail inside the induction pipe.

In the event of a load alternation from a vacuum to a pressure above atmospheric pressure in the induction pipe 3, the valve body 55 is intended to open broadly speaking immediately. Pressure above atmospheric pressure builds up rapidly in the second chamber 35, in fact, because air from the induction pipe 3 flows into the second chamber 35. At the same time, a vacuum continues to be present in the second section 63. This difference in pressure between the second chamber 35 and the second section 63 means that the spring force of the tension spring 73 can be overcome, in conjunction with which the valve element 69 moves to the left and places the second chamber 35 in flow connection with the second section 63, via the second passage 41. After the valve element 69 opens, air at a pressure above atmospheric pressure flows into the second section 63 via the second opening 41, and also to a certain extent via the first opening 39. This continues until the difference in pressure between the second section 63 and the second chamber 35 is such that the spring force overcomes the difference in pressure and, in so doing, closes the valve element 69. Pressure equalization continues, however, through the exchange of air via the first passage 39.

At the same time, atmospheric pressure is present in the first section 61. Because of the difference in pressure between the first section 61 and the second 63 section, the membrane 59 seeks to bow inwards into the first section 61 and, in so doing, to force the valve rod 47 to the left, viewed in FIG. 4. The valve body 55 in the second chamber 35 releases its grip on the valve seat 57 because of the displacement of the valve rod and opens the third passage 43 between the second chamber 35 and the second line 19. The brake servo unit 15 is now in direct connection with the induction pipe 3 via the second line 19, the valve device 31, the bypass line 29 and the first line 17.

In the event that a drop in pressure is still present over the throttle 7, that is to say it is not completely open, working air flows via the third line 27, through the Venturi tube 25 and back to the induction pipe 3 (downstream of the throttle 7). Precisely as described previously, a dynamic increase in pressure takes place in the narrowest part of the Venturi tube with a reduction in the static pressure as a result. In these situations, too, air can also be sucked out from the brake servo unit 15 and can be led into the Venturi tube 25 (due to the lower static pressure inside it), so that the build-up of the brake vacuum can continue, even if it is not as complete as when a vacuum is present in the induction pipe.

In this situation, with a pressure above atmospheric pressure in the induction pipe 3, and in the event that the driver releases the accelerator pedal for example in order to perform a correction of the speed of the vehicle with the help of the brake pedal 21, or a down-change of the gears in order to effect an overtaking manoeuvre, a comparatively transient load alternation takes place. The throttle 7 is closed temporarily, and the pressure in the induction pipe 3 falls temporarily, although it will revert rapidly to the previous pressure once braking is complete or when the change in gear has been accomplished.

In the case of this type of transient load alternation, it was not previously possible to utilize the pressure pulses generated in the induction pipe 3 due to the inherent inertia of the Venturi pipe 25. The Venturi pipe 25 does not have sufficient time, during the short period for which these sequences continue, to evacuate sufficiently large quantities of air from the brake servo unit 15 before the load condition has reverted to that which essentially prevailed before the load alternation.

This transient load alternation can be utilized with the help of the invention, however. During the load alternation, the pressure drops rapidly in the induction pipe 3, which means that the pressure falls more or less immediately in the second chamber 35. The valve element 69 is still in the closed position and, following this temporary reduction in pressure, presses even harder against the valve seat 71. A certain outflow takes place through the first passage 39, although this proceeds very slowly in the circumstances because of its small diameter. Instead, the valve body 55 continues to be in the open position and to hold the third passage 43 to the second line 19 open, and with it the connection to the brake servo unit 15.

The bypass line 29 is accordingly entirely open during these transient load alternations, in conjunction with which the Venturi tube 25 is short-circuited. Air can be sucked into the induction pipe 3 considerably more easily via the second line 19, the valve arrangement 31 and the first line 17, than through the Venturi tube 25, thereby permitting a rapid build-up of a vacuum in the brake servo unit 15. In order to accelerate this build-up of a vacuum even more, the bypass line 29, the first line 17 and the second line 19 have the largest possible diameters, preferably larger than 9 mm, as their internal diameters in order for these to offer the smallest possible flow resistance.

In the event of a load alternation from positive pressure to a vacuum inside the induction pipe 3, for example when changing from main road driving to driving in a traffic queue, a vacuum is present, in precisely the same way as in the previously described transient load alternation, in the induction pipe 3 and consequently in the second chamber 35. The valve element 69, for this reason, continues to be in its closed state and to hold the second passage 41 closed. Air exchange is only possible through the first passage 39, although this takes place slowly because of its small diameter. This is advantageous because a slow pressure equalization between the vacuum present in the second chamber 35 and the second section 63 is desirable. The valve body 55 thus moves slowly to the right (viewed in FIG. 4), until it adopts a closed position resting against the valve seat 57 of the third passage 43. This can take several seconds with a well-considered diameter for the first passage 39. During this comparatively long period, a vacuum has sufficient time to be built up in the brake servo unit 15 before the valve body 55 fully closes the third passage 43.

Where a vacuum is present for a longer duration inside the induction pipe 3, however, it is not desirable to have an open connection to the induction pipe via the bypass line 29, because large quantities of air would then be able to flow freely into the induction pipe 3 and, having regard for the comparatively small quantities of air which pass through this on their way to the cylinders in these operating modes, this evacuation of air from the brake servo unit 15 could result in strong variations in the speed of rotation of the engine 1, which cannot be regarded as being desirable. The air from the brake servo unit 15 will by now have entered this when the brake pedal 21 is released after completed braking of the vehicle, and it will accordingly not have passed through the mass air flow sensor 11 of the engine. The control device of the engine consequently finds it more difficult to compensate for these quantities of air, which results in variations in the speed of rotation, which are generally noticeable when a vacuum is present in the induction pipe 3. Instead, the process of building up a brake vacuum in the brake servo unit 15 under low loads and at low speeds continues as described above, that is to say through the Venturi tube 25 with the assistance of the working air through the third line 27.

When a positive pressure is present inside the induction pipe 3, this is of less significance when comparatively large quantities of air pass through the induction pipe 3 on their way to the cylinders, for which reason the evacuated quantities of air from the brake servo unit 15 do not produce such a strong effect on the speed of rotation.

Figure 5:
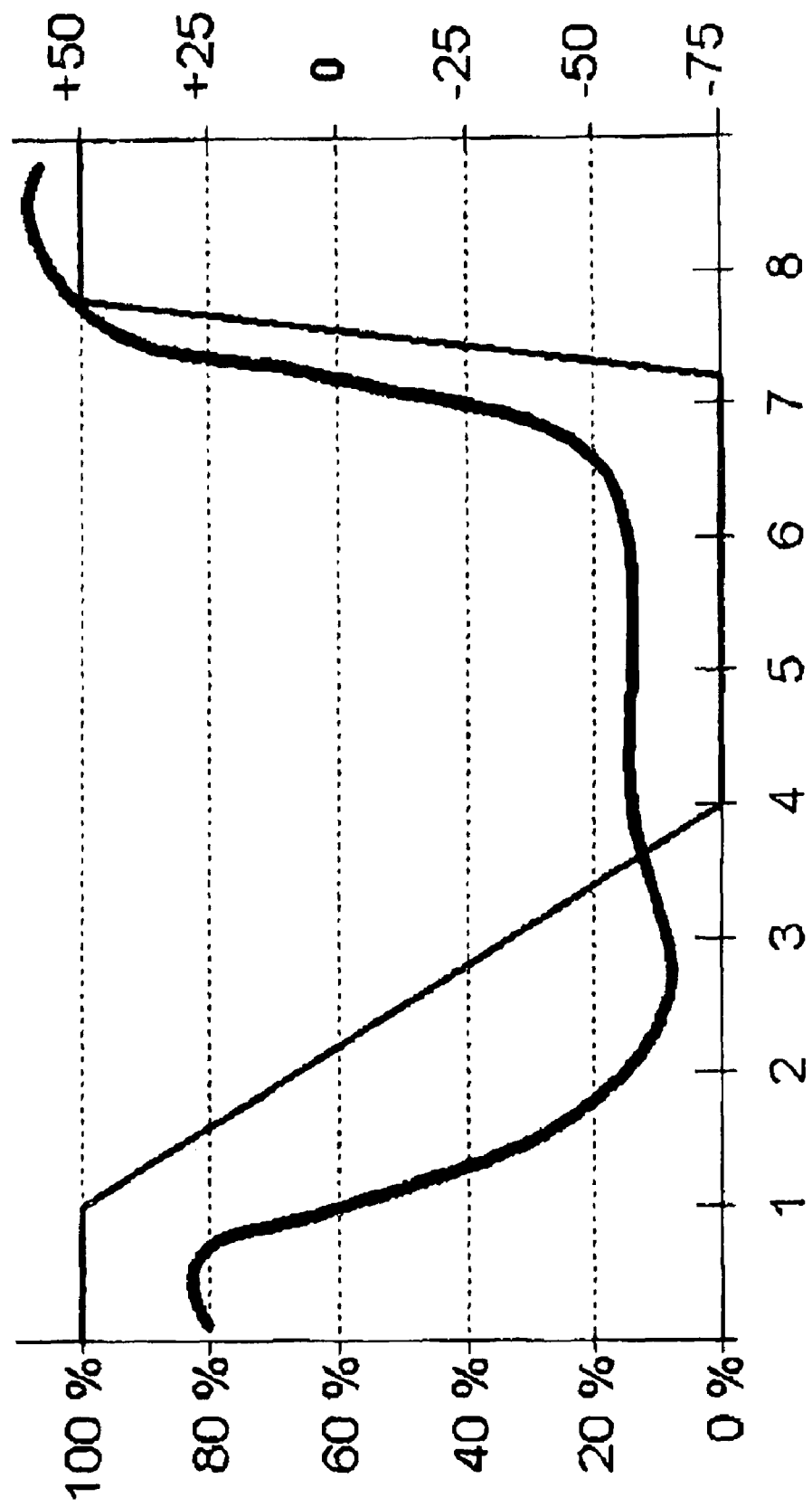
FIG. 5 depicts the opening/closing characteristic for the valve arrangement.

FIG. 5 depicts a preferred example of the opening and closing characteristics of the valve arrangement 31. The figure shows the charging pressure inside the induction pipe 3 (heavy line, −75 kPa to +50 kPa) and the position of the valve body (thin line, 0-100% open) as a function of the time (sec.). As can be appreciated, the charging pressure varies between a vacuum of approximately −70 kPa and a positive pressure of slightly more than 50 kPa. The reason for this is to illustrate the changes in pressure that can occur in the induction pipe 3 during varied driving.

Initially, the valve body 55 is in the fully open position, at the same time as a positive pressure of approximately +25 kPa is present in the induction pipe. At the elapsed time of 1 second, when the pressure in the induction pipe falls below 0 kPa, the valve body 55 begins its closing movement. As described previously, this movement is damped (it takes about 3 seconds in this example, but it may be in the order of 2-10 seconds). The pressure equalization between the induction pipe 3 and the brake servo unit 15 thus has sufficient time to take place before the valve body 55 has closed completely.

The valve body then remains in the closed position for slightly more than four seconds, after which it opens once more when the pressure inside the induction pipe rises above 0 kPa. Unlike the closing movement, the opening movement takes place significantly faster (it takes about 0.5 second in this example, but it is preferably shorter than 0.5 second). The bypass line is thus set rapidly to the open position, in readiness for the evacuation of air from the brake servo unit.

In the example depicted, a vacuum is actually present in the induction pipe for approximately 6 seconds (from the elapsed time of 1 second to the elapsed time of 7 seconds). If, on the other hand, we had been concerned with a transient pressure drop, for example in conjunction with changing gear, and with a duration of a few tenths of a second, the valve body would not have had sufficient time to close before the pressure conditions inside the induction pipe had returned to the effectively prevailing conditions before the gear change. The valve body 55 accordingly remains in the open position, and the Venturi tube continues to be bypassed in the event of a transient vacuum being present in the induction pipe.

The invention claimed is:

1. Internal combustion engine of the Otto type comprising:
   an induction pipe in conjunction with the engine's cylinders,
   a brake servo unit,
   a valve arrangement, and
   a flow connection for evacuating air from the brake servo unit to the induction pipe for the purpose of building up a vacuum inside the brake servo unit, in conjunction with which a Venturi unit is arranged in the flow connection to assist with the building up of the aforementioned vacuum, the flow connection comprising a bypass line having a lower flow resistance than the Venturi unit, the bypass line extending from two ends of the valve arrangement, the valve arrangement including a valve body which closes the entrance from the valve arrangement to the portion of the bypass line between the valve arrangement and the brake servo unit for the purpose of conducting air through the Venturi unit, and which opens the entrance from the valve arrangement to the portion of the bypass line between the valve arrangement and the brake servo unit for the purpose of conducting air through the bypass line for the purpose of conducting the evacuated air past the Venturi unit in the event of a transient vacuum in the induction pipe, characterized in that the valve body moves to an open position in conjunction with load alternations from a vacuum to a positive pressure in the induction pipe, and the valve body moves to a closed position in conjunction with load alternations from a positive pressure to a vacuum in the induction pipe, the moving of the valve body to a closed position taking place at a speed such that pressure equalization, between the induction pipe and the brake servo unit in the event of a transient vacuum in the induction pipe, has sufficient time to take place before the valve body has reached a closed position.

2. Internal combustion engine according to claim 1, in which the bypass line is arranged parallel over the Venturi unit.

3. Internal combustion engine according to claim 1, in which the flow connection comprises a first line which connects a flow from the Venturi unit to the induction pipe, and a second line, which connects a flow from the Venturi unit to the brake servo unit.

4. Internal combustion engine according to claim 3, in which the flow connection also includes a third line, which connects a flow from the Venturi unit to the induction pipe upstream of the engine's throttle, in conjunction with which the third line is intended to lead working air to the Venturi unit when a pressure drop is present over the throttle.

5. Internal combustion engine according to claim 3, in which the first line, the second line and the bypass line have an internal diameter of $\geqq 9$ mm.

6. Internal combustion engine according to claim 3, in which the bypass line has a first end connected to the first line and a second end connected to the second line.

7. Internal combustion engine according to claim 1, in which the valve body moves from the closed to the open position in a time of the order of <0.5 second.

8. Internal combustion engine according to claim 1, in which the valve body moves from the open to the closed position in a time of the order of 2-10 seconds.

9. Apparatus for building up a brake vacuum, the apparatus comprising a brake servo unit and a flow connection between the brake servo unit and an induction pipe in an internal combustion engine of the Otto type for the evacuation of air from the brake servo unit to the induction pipe, the apparatus being configured for the purpose of building up a vacuum in the brake servo unit, the apparatus further comprising a Venturi unit to assist with the building up of a vacuum in the brake servo unit, a valve arrangement, and a bypass line having a lower flow resistance than the Venturi unit, the bypass line extending from two ends of the valve arrangement, the valve arrangement including a valve body which closes the entrance from the valve arrangement to the portion of the bypass line between the valve arrangement and the brake servo unit for the purpose of conducting air through the Venturi unit, and which opens the entrance from the valve arrangement to the portion of the bypass line between the valve arrangement and the brake servo unit for the purpose of conducting air through the bypass line for the purpose of conducting the evacuated air past the Venturi unit in the event of a transient vacuum in the induction pipe, characterized in that the valve body moves to an open position in conjunction with load alternations from a vacuum to a positive pressure in the induction pipe, and the valve body moves to a closed position in conjunction with load alternations from a positive pressure to a vacuum in the induction pipe, the moving of the valve body to a closed position taking place at a speed such that pressure equalization, between the induction pipe-and the brake servo unit in the event of a transient vacuum in the induction pipe, has sufficient time to take place before the valve body has reached a closed position.

* * * * *